US010756913B2

(12) United States Patent
Jones et al.

(10) Patent No.: US 10,756,913 B2
(45) Date of Patent: Aug. 25, 2020

(54) CREATION AND CONVEYANCE OF DEVICE-TARGETED MESSAGES

(71) Applicant: INTERNATIONAL BUSINESS MACHINES CORPORATION, Armonk, NY (US)

(72) Inventors: Andrew R. Jones, Round Rock, TX (US); Gregory J. Boss, Saginaw, MI (US); Kevin C. McConnell, Austin, TX (US); Charles S. Lingafelt, Durham, NC (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/004,113

(22) Filed: Jun. 8, 2018

(65) Prior Publication Data

US 2019/0379552 A1 Dec. 12, 2019

(51) Int. Cl.
*H04L 12/18* (2006.01)

(52) U.S. Cl.
CPC ........ *H04L 12/1854* (2013.01); *H04L 12/189* (2013.01)

(58) Field of Classification Search
CPC ... H04L 65/4084; H04L 67/306; H04L 67/22; H04L 12/18; H04L 12/189; H04L 12/1845; H04L 12/1854; H04L 12/1859; H04L 12/1895; H04L 51/10
USPC ........................................... 709/201
See application file for complete search history.

(56) References Cited

U.S. PATENT DOCUMENTS

| 7,028,071 | B1* | 4/2006 | Slik ........................ G06Q 30/02 |
| | | | 348/E7.071 |
| 7,779,438 | B2* | 8/2010 | Davies .................... H04N 5/783 |
| | | | 725/135 |
| 8,386,304 | B2 | 2/2013 | Chen et al. |
| 8,763,032 | B2 | 6/2014 | Hjelm et al. |
| 8,910,201 | B1 | 12/2014 | Zamiska et al. |
| 9,584,836 | B2* | 2/2017 | Fei ........................ H04N 21/252 |
| 2002/0080753 | A1* | 6/2002 | Lee ...................... H04L 63/0428 |
| | | | 370/338 |

(Continued)

OTHER PUBLICATIONS

D. Arp et al., "Privacy Threats through Ultrasonic Side Channels on Mobile Devices" (date unknown) (downloaded from http://christian.wressnegger.info/content/projects/sidechannels/2017-eurosp.pdf on Jun. 7, 2018).

(Continued)

*Primary Examiner* — Ruolei Zong
(74) *Attorney, Agent, or Firm* — Donald J. O'Brien

(57) ABSTRACT

A system and computer-implemented method for using a broadcast medium to transmit messages targeted to and received by only particular individuals or groups within an audience of the broadcast. Messages, such as alerts, polls, and advertisements, may be augmented with one or more addresses corresponding to particular individuals or groups of people with particular activity or demographic qualities. The message may be injected into and even concealed within the stream in a format that may cause an ordinary device to present the stream without having perceptibly changed it, but may allow a smart device to receive the message, determine that it was intended for a user, and present it to the user.

20 Claims, 6 Drawing Sheets

(56) References Cited

U.S. PATENT DOCUMENTS

| | | | |
|---|---|---|---|
| 2008/0229353 A1 | 9/2008 | Morris et al. | |
| 2009/0136087 A1* | 5/2009 | Oren | G06T 1/0021 |
| | | | 382/100 |
| 2010/0241753 A1* | 9/2010 | Garbajs | H04L 63/0428 |
| | | | 709/227 |
| 2012/0316934 A1* | 12/2012 | Zier | G06Q 30/02 |
| | | | 705/14.4 |
| 2015/0046267 A1* | 2/2015 | MacTiernan | G06F 16/68 |
| | | | 705/14.66 |
| 2016/0147713 A1* | 5/2016 | Ni | G06F 16/345 |
| | | | 345/660 |

OTHER PUBLICATIONS

C. Cimpanu, "234 Android Applications Are Currently Using Ultrasonic Beacons to Track Users" (dated May 4, 2017) (downloaded from https://www.bleepingcomputer.com/news/security/234-android-applications-are-currently-using-ultrasonic-beacons-to-track-users/ on Jun. 7, 2018).

R. Beschizza, "235 apps attempt to secretly track users with ultrasonic audio" (dated May 4, 2017) (downloaded from https://boingboing.net/2017/05/04/235-apps-attempt-to-secretly-t.html on Jun. 7, 2018).

Schneier on Security, "Ads Surreptitiously Using Sound to Communicate Across Devices" (Nov. 18, 2015), downloaded from https://www.schneier.com/blog/archives/2015/11/ads_surreptitio.html on Jul. 7, 2018.

* cited by examiner

CREATION AND CONVEYANCE OF DEVICE-TARGETED MESSAGES

FIELD OF INVENTION

This disclosure relates to systems and methods for network message routing, and more specifically, to selectively delivering a message over a network to a device or subset of devices based in part on their physical proximity to other devices.

BACKGROUND

In many communications networks used today, a message may—by the nature of the network, the devices and protocols involved, or other factors—be broadcast to all recipients on the network prepared to receive it, such as all set top boxes in a cable network, all browsers being used to view of an online live media platform like Facebook® Live or Twitch®, or all radios tuned to a given station. Historically, many communications networks have had this property, ranging from telegraph networks to ethernet networks.

Lack of ability to differentiate among recipients leads to inefficiency from the point of view of the recipient (for example, receiving an emergency alert over the radio that does not apply to the listener), as well as the broadcaster (for example, the broadcast's nature typically only allowing one message to be transmitted to the entire audience at a given time). Additionally, a broadcaster typically has no way of knowing which recipients or devices are currently receiving the broadcast, or any characteristics of the broadcast's current audience.

SUMMARY

A system for message delivery is disclosed, comprising an addressing database, an analytics engine, a message injection computing device, and a receiving application. The analytics engine is configured to select a subset of recipients from a broadcast audience to whom a message should be broadcast, based on one or more rules determined by a user of the analytics engine. The message injection component is configured to receive, from the addressing database, a set of one or more addresses indicating a set of recipients for a message; inject, into a stream received from a stream origin computing device, a message comprising the set of addresses; and transmit, to one or more remote display devices used by an addressed recipient of the message, and to one or more remote display devices used by one other than an addressed recipient of the message, the stream into which the message has been injected. The receiving application is configured to store one or more addresses representing qualities of a device executing the receiving application or of a user of the device; determine that a stream displayed by one of the remote display devices comprises the message; and responsive to determining that one or more of the stored addresses matches one or more of the set of addresses in the message, notify a user of the device executing the receiving application that the message is addressed to the user.

A method for isolation of a targeted message from a broadcast is disclosed. The method comprises determining, by an application running on a display device, that a broadcast received by the display device comprises a message in an inaudible and visually imperceptible format and that the message comprises one or more addresses, and transmitting, to a secondary display device communicatively coupled to the display device, the message or a transformation of the message into an audible or visible form. Responsive to determining that one or more addresses of the message match one or more addresses stored in the display device or the secondary display device, content of the message is displayed by an application running on the secondary display device.

A method of generating a targeted message for transmission over a broadcast medium is disclosed. The method comprises receiving a stream of audio or video data and receiving a message for transmission to a subset of an audience of the stream, selected by an analytics engine applying one or more rules configured by a user of the analytics engine. A set of one or more addresses corresponding to the subset of the audience is added to the message, and the message is injected into the stream in a form that does not audibly or visibly convey to a human recipient a content of the message; and the stream is broadcast to the audience of the stream.

DETAILED DESCRIPTION

The lack of adequate methods for using a broadcast medium to transmit messages targeted only to particular individuals or groups without causing the message to be perceived or acted upon by the remainder of the audience, highlighted above, may be addressed by creating a system for injecting messages into a stream that include addresses assigned to particular users or groups and providing an application at the terminal end of the stream to detect and display messages injected into the stream. There is considerable value in being able to use what is traditionally a one-way, broadcast-only network to transmit messages or information that is targeted only to a specific recipient among all viewers/listeners, to a subset of recipients, to devices used by those recipients to display the messages, or to other devices in the use or possession of those recipients.

Figure 1:
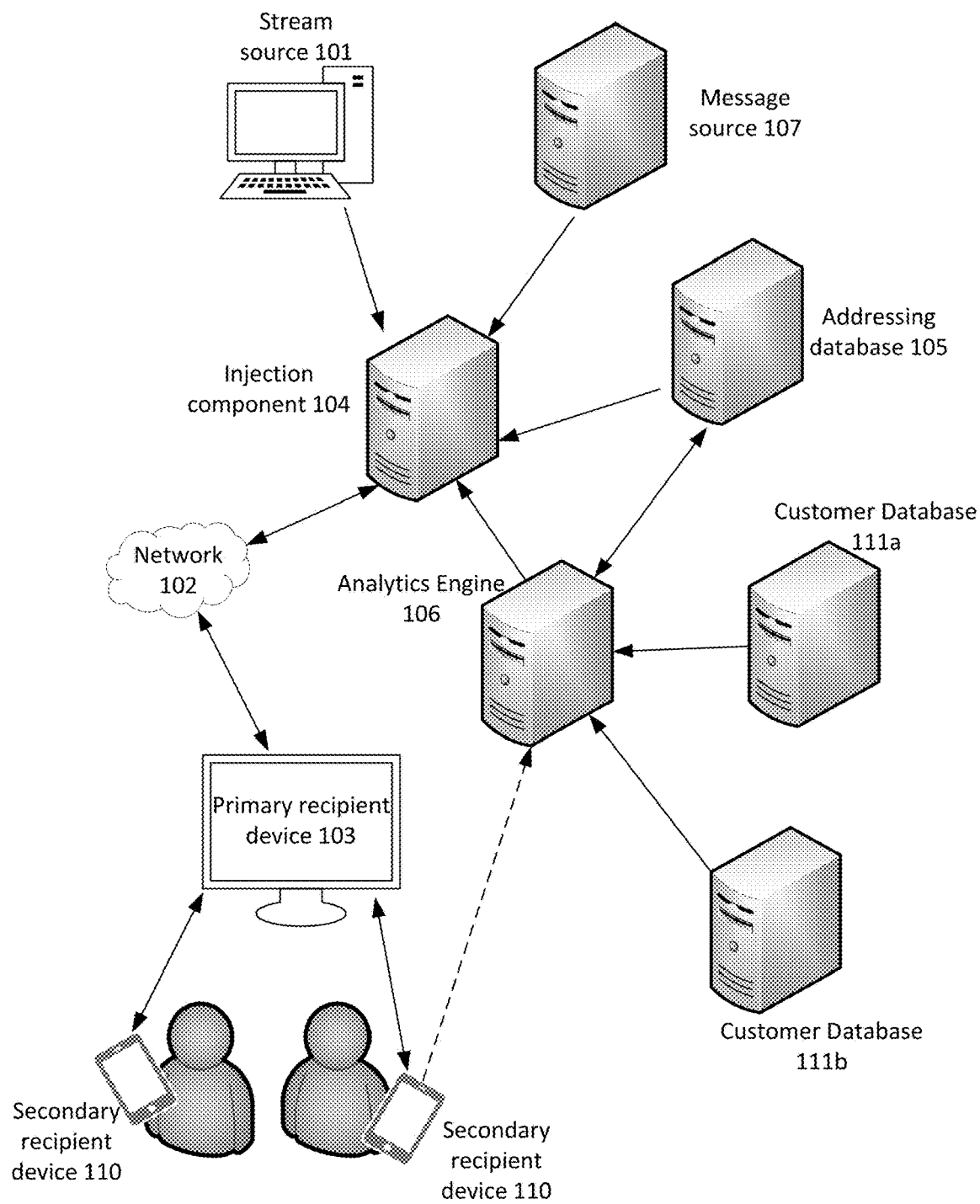
FIG. 1 illustrates, in simplified form, a system of computing devices for sending and receiving a broadcast comprising a message to a subset of the broadcast's recipients.

With reference now to FIG. 1, a streaming origin 101 may generate a digital or analog stream normally intended to be received and displayed to a user by primary recipient device 103 (e.g., a television, computer, radio, etc.), either via transmission over network 102 or, in some embodiments such as terrestrial radio or satellite radio, by direct transmission without intermediate networks or devices. The stream itself may comprise video only (e.g., footage of a panda cam or bald eagle cam), audio (e.g., a podcast, internet radio, satellite radio, terrestrial radio, or a streaming music service like Spotify®, etc.), or both (e.g., cable television, a video storage and streaming site such as YouTube® or Netflix®, a live streaming platform such as Twitch® or Facebook® Live, etc.). Streaming origin 101 may thus be, for example, a cable television head end, a web server, a content creator's personal computer, an audio processing system at a radio station, a video camera, or any other system where a stream is entered or generated in preparation for broadcast to an audience.

A stream message injection component 104 may receive the stream from streaming origin 101 in order to augment the stream by injecting or embedding a message into it before transmission to the users' primary recipient devices 103 (discussed in greater detail below and in FIG. 2). The end content message to be added may be received by the injection component 104 from a separate message source computing device 107 (such as, for example, a server storing advertisements, a pollster generating questions for viewers, or a governmental system generating an emergency alert, etc.) or may be entered directly at the injection component by a user.

The message may include, in addition to the end content of the message intended for a user to experience (such as, for example, an emergency alert, a news alert, a polling question, an advertisement, etc.), one or more addresses indicating a subset of the audience/viewership intended to receive the message.

For example, an address might indicate a unique human; a unique device; a set of all devices of a particular brand; a set of all devices from a particular manufacturer; a set of all people living in a particular household, neighborhood, town, city, ZIP code, county, state, region, or nation; a set of all people currently within a particular household, neighborhood, town, city, ZIP code, county, state, region, or nation, regardless of permanent residence; a set of all people having an income greater than a particular minimum income or less than a particular maximum income; a set of all people having a net worth greater than a particular minimum value or less than a particular maximum value; a set of all people whose age is greater than a particular minimum age and/or less than a particular maximum age; a set of all people with a particular gender identity or other demographic classification such as race, ethnicity, citizenship, or religion; a set of all customers of a particular business; a set of all people who have purchased a particular item; a set of all people who have a particular smart appliance in their home; a set of all people who have used a search engine to query a particular term; a set of all people who have viewed or not viewed a particular piece of entertainment content; a set of all people who are registered with a particular political party; a set of all people with membership in another social organization; a set of all people with accounts on a particular online service, including social media; a set of all people with a given employment or certification; or any other classification that a message-sending entity might wish to use to differentiate among recipients.

Message addresses and significances of those addresses may, in some embodiments, be determined by an analytics engine 107, which may also have access to and query a number of external customer databases 111a, 111b, etc. The external customer databases may store, for example, lists of customers who have bought a product, logs of customers who have visited a particular web page, lists of voters registered with a certain party, lists of subscribers to a service, lists of addresses or contact information for actual or potential customers, or records of demographic data of actual or potential customers. In other embodiments, the analytics engine 107 may not determine new addresses, and instead receive existing addresses and significances of those addresses, already determined by another device or a human user.

In a preferred embodiment, an address may be a unique integer (such as, for example, an 8-digit number) that is associated with each recipient significance in an address database 105. In other embodiments, the address may be in the form of a string rather than an integer. The addresses may be unrelated to their semantic significance (such as, for example, integers that are automatically incremented as new significances are determined and assigned) or may store semantic content (such as, for example, hierarchically assigning successive series of bits to divisions of a semantic space, just as IP addresses denote a location or purpose with their most significant bits, or Dewey decimals indicate a genre with more significant bits and a subgenre with less significant bits). Thus, in some embodiments, particular digits, letters, or substrings of an address may indicate significance of an address to a person familiar with the addressing scheme but without access to address database 105, while in other embodiments, knowing the address may indicate nothing about its significance without correlating the address with an entry in address database 105.

In some embodiments, a message might comprise a boolean combination of multiple addresses. For example, in a system where address1 indicates a minimum age of 18, address2 indicates living in New York, and address3 indicates ownership of an Android device, a message might indicate ((address1 AND address2) AND NOT address3) to direct an advertisement for an Apple-only mobile app to adults living in New York. In other embodiments, an address itself may be generated to represent the boolean combination, so that a message comprises only a single address. For example, address4 might be created to represent ((address1 AND address2) AND NOT address3), and in the example above, the message may include only address4.

In some embodiments, a portion or the entirety of the address may be replaced by a wildcard signifier, which may indicate that all possible recipients, or a set of addresses, should be shown the message, instead of only a single address' individuals. For example, the address "1234567*" could be used to indicate all addresses from "12345671" to "12345679", or the address "*" could be used to indicate all addresses in the system.

The users receiving the displayed stream may have, on their persons or nearby, secondary devices 110. These secondary devices may be, for example, smartphones, handheld gaming consoles, personal digital assistants, laptop computers, desktop computers, or other computing devices that may comprise a means of receiving communications such as a WiFi adapter, Bluetooth, microphone, camera, or other means of receiving a communications signal from the primary recipient device 103 wirelessly. The users may have previously installed on their secondary recipient devices an application (discussed in greater detail below with respect to FIG. 3) for interpreting received messages and/or providing user feedback to a sender of the messages. Alternatively, in some embodiments, primary recipient device 103 may be a smart TV, laptop computer, desktop computer, or other computing device that is capable of running an application to interpret received messages and/or provide user feedback to a sender of the messages.

An analytics engine 106 (which may be, in an example embodiment, Watson Services of IBM) may track or analyze a number of variables or parameters, including (but not limited to) real-time information regarding the audience of a stream; historical data regarding advertisement impressions or viewership of past similar streams; analysis of the most effective times or audiences for a particular advertisement; and/or classifications of users into groups (for use in the addressing scheme described above) that are statistically relevant through regression, machine learning, or other artificial intelligence methods, etc. The analytics engine 106, through access to the address database 105 and optionally the external customer databases 111, may be able to convert a set of entered rules for a subset of an audience that should be shown a message (such as all people of a certain age living in a certain area, or all people who have visited a certain website and have a certain income range) to a set of appropriate addresses to ensure that the message is properly addressed for showing only to that subset of the audience.

Figure 2:
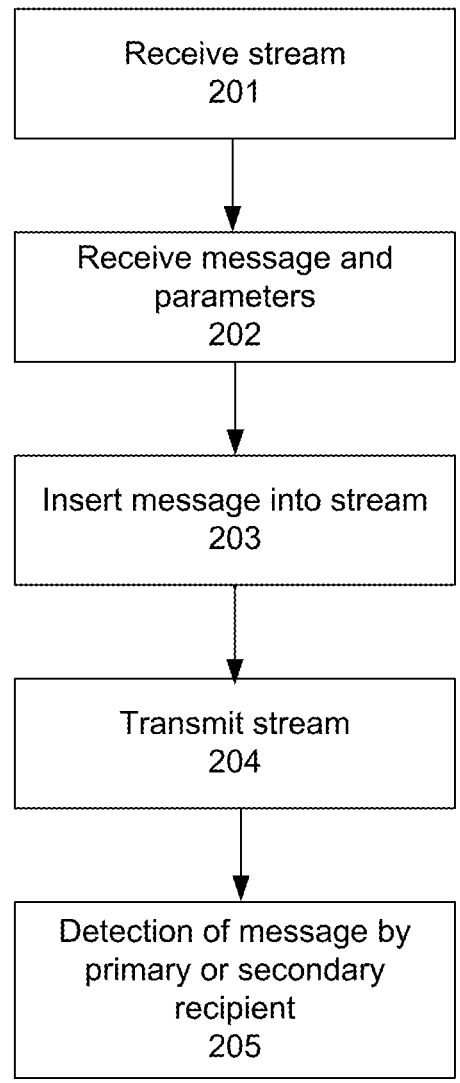
FIG. 2 illustrates, in simplified form, a flowchart of a method for preparing the broadcast for transmission by adding a message.

FIG. 2 illustrates, in simplified form, a flowchart of a method for preparing the broadcast for transmission by adding a message.

With reference now to FIG. 2, the injection component 104 may receive a stream into which a message should be injected (Step 201). The injection component 104 may also receive a message and a set of parameters (Step 202) from the analytics engine 106 or another computing device regarding to whom the message should be shown and under what additional circumstances the message should be shown.

For example, the message might be indicated for sending and eventual showing to a human viewer only if the stream is being shown at a given moment in time (such as, for example, during a given part of the day, after or before dark, at the top of the hour or at a particular point within any hour, or on a given day, or month, or season, or year).

In another example, the message might be indicated for sending and eventual showing to a human viewer only at a given moment in the stream (such as during a particular scene of a film, or before or after a particular portion of the stream length has elapsed), or during a particular phase of a live stream (such as, for example, a period for live voting during a televised talent contest or reality show).

Figure 3:
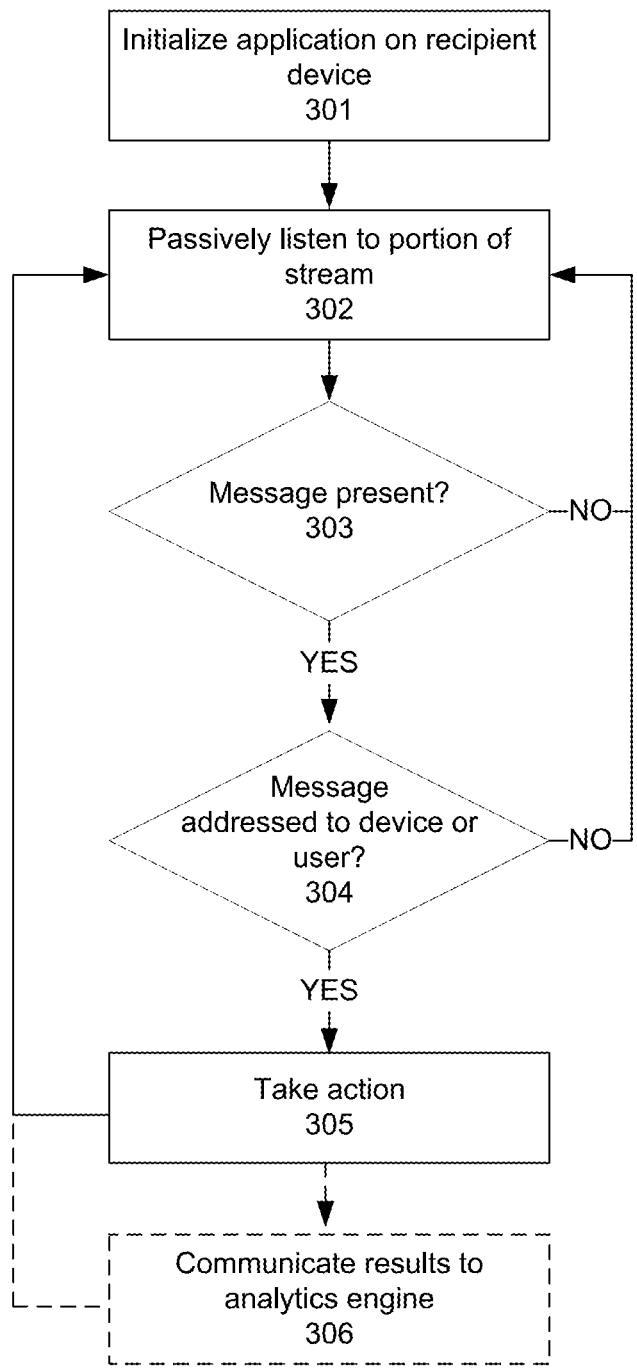
FIG. 3 illustrates, in simplified form, a flowchart of a method of receiving and acting upon a message within the received broadcast.

In a third example, the message might be queued to be sent and eventually shown only to a subset of recipients who had a particular active or passive response to a message that was displayed at an earlier point in the stream (such as, for example, those who responded to a first polling question, or who viewed a first advertisement without closing out of the application) (this closed-loop functionality to modify the broadcast based on past actions in the broadcast is discussed further below regarding Step 306 in discussion of FIG. 3).

The addresses to whom the message should be sent may be determined by the analytics engine, based on rules entered by a user of the analytics engine and on querying the address database 105 for addresses which satisfy the entered rules, and forwarded along with the message. Alternatively, the addresses may be determined by the injection component 104 after receiving the recipient parameters in another form and querying the address database 105 to determine the appropriate set of addresses corresponding to the intended recipient or group of recipients.

In some embodiments, the injection component 104 may have real-time information (as reported by primary recipient devices 103 or secondary recipient devices 110) regarding which users are currently consuming the stream. The injection component 104 may determine that a given message is not addressed to anyone currently consuming the stream, and thus decline to inject the message until it is determined that at least one valid recipient will be able to receive the message.

After the message's display parameters and recipient addresses have been determined, the message and recipient addresses may be inserted into the stream at an appropriate point in the stream (Step 203).

Insertion into the stream may involve converting the message before addition to the stream or embedding the message in the stream in a converted form. For example, the message may be converted to an audio signal that is ultrasonic (i.e., at frequencies greater than 20,000 Hz) or infrasonic (i.e., at frequencies less than 20 Hz) and simply overlaid with an audio track being broadcast. The message may be converted into a bit stream and the least significant color bits of a video stream modified to convey the bits of the message without a change that is easily perceptible to a human viewer. Portions of the message may be embedded in data packets, unused audio or visual channels, or otherwise steganographically concealed within the stream.

In other embodiments, instead of hiding the message completely from the viewer, the message may be visible or audible, but not easily decipherable. For example, the message might be expressed in a QR code or bar code added to a corner or side of a single frame or a portion of video, or expressed by a unique audio pattern that is audible but subtle, such as quiet Morse code beeps at a predetermined frequency.

The modified stream is then transmitted to the primary recipient device 103 (Step 204).

The primary recipient device 103 may be configured to detect messages according to any one or more of the protocols described above (Step 205), and be able to convert the injected message back to the original message, or to perform instructions given within the original message, or not do anything except pass the message on to a secondary recipient device. The message may then be made available to the user directly through primary recipient device 103, or the message may be sent to a present secondary recipient device (Step 206) via Bluetooth, WiFi, near field communication, infrared signal, or other wireless or wired networking connection for display of the message or performance of instructions it contains by that secondary recipient device. Processing of the received message is discussed in greater detail regarding FIG. 3, below.

FIG. 3 illustrates, in simplified form, a flowchart of a method of receiving and acting upon a message within the received broadcast.

With reference now to FIG. 3, when a message receiving application is initialized on a secondary receiving device 110, it may first communicate with the analytics engine 106 or the addressing database 105 to determine if any addresses stored in the secondary receiving device 110 need to be updated (Step 301). For example, a user may have bought an item, viewed content, or changed residences since the last time the application was initialized, leading to deletion of outdated addresses or addition of new ones to reflect the user's new characteristics. The analytics engine 106 or the addressing database 105 may store updated data gleaned about each user in order to facilitate updates when the application on the secondary receiving device requests it.

During the initialization process, the application may also formally notify the analytics engine that a particular stream is being consumed by a user of the secondary receiving device, to enable the possibility of checking for an existing audience before message insertion in the stream by the injection component 104.

If the application on the secondary receiving device 110 is being initialized for the first time, it may not yet be associated with a user, and may store a wildcard address (enabling receipt of any message meant to be broadcast to all users), an address that is partially a wildcard, or only addresses that can be determined based on the device itself (such as, for example, an address indicating the device's brand or model, or an address indicating a current location determined by GPS or other location services of the device).

In some embodiments, the application may be able to update some of its own addresses without communication with the analytics engine 106 or the addressing database 105. For example, as mentioned above, the application may be able to query the device to learn its brand, model, or current location determined by GPS or other location services. The application may store sufficient addressing information to know the addresses associated with that information without querying the addressing database 105. In addition, if the user has used the device to view content, make purchases, perform web searches, or take other actions, the application may be able to automatically update addressing to reflect these actions.

After initialization, the application may enter a passive listening mode (Step 302) and attempt to "overhear" a message hidden in a portion of the stream output by primary recipient device 103 (for example, receiving an ultrasonic or infrasonic message via a microphone of the secondary recipient device 110, or receiving a bar code or QR code via a camera of the secondary recipient device 110) or check periodically whether the primary recipient device 103 is notifying the application (over wireless internet, Bluetooth, or another method) that a message was present in a portion of the stream (Step 303).

In some embodiments, there may be no secondary devices 110, and the application may run on the primary recipient device 103 instead. In such an embodiment, the primary recipient device 103 may simultaneously output the stream while an application on the primary recipient device may be reviewing the stream for a message contained within it.

If no message is present, the application returns to passively listening and checking the stream for presence of a message in a next portion of the stream.

If a message is present, the application determines whether the message is addressed to the user currently using the primary recipient device 103 or secondary recipient device 110 (Step 304). Checking the addresses may involve determining that a single address within the message is an address that currently is stored within the application to refer to itself or to its user. In some embodiments, checking the addresses may involve evaluating a boolean expression to confirm that the set of addresses stored by the application evaluates to true in the boolean expression. In some embodiments, checking the addresses may mean that a particular subset, substring, portion, or aspect of the address matches, instead of requiring a complete match.

If the message is not addressed to the given device or user, the application returns to passive listening. If it is addressed to the given device or user, action is taken in accordance with the message (Step 305).

Example actions that may be taken may include: displaying video, audio, images, and/or text via a screen or speaker of the secondary recipient device 110; displaying video, audio, images, and/or text overlaid with or replacing the stream output of primary recipient device 103; activating an interactive feature of the application, such as prompting a user for input, displaying a hyperlink to web content, polling a user for questions, displaying a game or interactive advertisement for a user to play with; or transmitting a command or query to a smart device nearby, such as a refrigerator, thermostat, lighting, curtains, or speakers in a home that can be remotely controlled by a mobile device.

If the action involves interactivity, the application may transmit to the analytics engine 106 or other server-side computing devices information regarding choices made by the user or information input by the user (Step 306). The information or choices may be used to update the user's addressing (for use in further, more focused targeted messaging in the future) or to update other aspects of a profile that may be stored regarding a user's preferences, commercial activity, demographic information, or other information.

In one example embodiment highlighting a number of the features described above, a political advertisement for a candidate may be marked with a message intended for all members of the candidate's party who reside in the candidate's constituency area and who are above age 18. The message, when received by a user's smartphone while the user watches the advertisement on television, may be prompted to indicate whether the user approves or disapproves of the candidate, and asks what political issues the user cares about with respect to the candidate. The user's responses may be sent back to the analytics engine for storage and use in future targeted communications via other media.

In another example embodiment, a movie may have advertisements for pizza, combined with a hyperlink to order a pizza online from a local pizzeria, inserted for display by a smartphone in the room, but only during a scene of the movie in which a character is eating pizza and is not near the climax of the movie, and only if the movie is being played in the evening.

In another example embodiment, an extreme weather alert may be incorporated into a radio broadcast, but inaudibly and in parallel with the audio, and addressed to only users currently in a specific county, so that the alert does not disrupt the broadcast for all users, and only triggers display by a smartphone or by other devices, including the radio itself, that may be configured to detect and evaluate the message.

In another example embodiment, a televised advertisement on television for an R-rated movie may cause the smartphones of users who are 17 years of age or older to display additional information about purchasing tickets, while the smart phones of users who are 16 and under may display an advertisement for a different film, instead.

In another example embodiment, a televised advertisement for a car dealership may be accompanied by messages that differentiate by user location and income level, so that more wealthy users are notified of luxury cars near them, other users are notified of used cars near them, and no user is notified of a car for sale that is more than a specified distance from their residence.

In another example embodiment, a televised advertisement for a generic department store, grocery store, or other business with varying types of merchandise may have additional targeted ads regarding items that are on sale and which are only displayed to users that have searched online for a similar item in the past two weeks.

In another example embodiment, a televised advertisement for an "adult" product may be replaced by the primary recipient device 103 with a different advertisement when a minor is known to be viewing the stream. Similarly, an advertisement for feminine hygiene products or another product with significant gender imbalance among purchasers may be replaced by a different advertisement if all viewers present at a primary recipient device are male. Additionally, advertisements primarily relevant to an older age group, such as advertisements related to the AARP or to certain medications, may be replaced by the primary recipient device 103 if all viewers at the device are below a threshold age.

In another example embodiment, an interactive advertisement may be embedded in a stream in the form of a game to be played by a user on the user's mobile device, and the selection of which game from a set of games should be presented may be based on whether the user has chosen to interact with advertisement games in the past, and if so, which ones.

In another example embodiment, a particular "block" of advertising space may be sold by a broadcaster to multiple mutually exclusive advertisers, such as candidates in a party primary for different political parties or who are running for office in different jurisdictions. By attaching exclusive location- or political party-based addresses to different ads and transmitting all the ads in the broadcast at the same time, a user's secondary device may show the only ad of the set that is applicable to a given user based on the user's determined political party and residence location.

Figure 4:
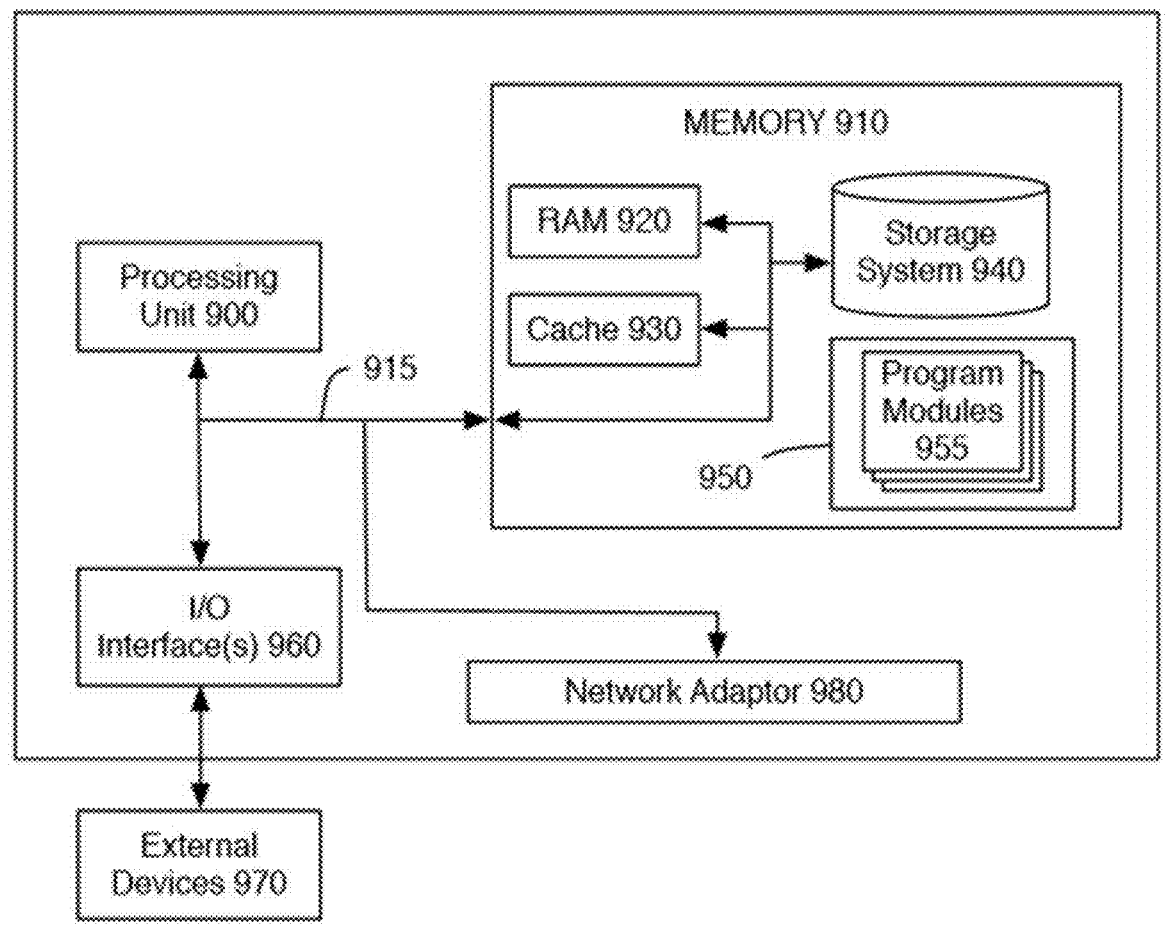
FIG. 4 is a block diagram of a representative computing device that may be utilized to implement various features and processes described herein.
Figure 5:
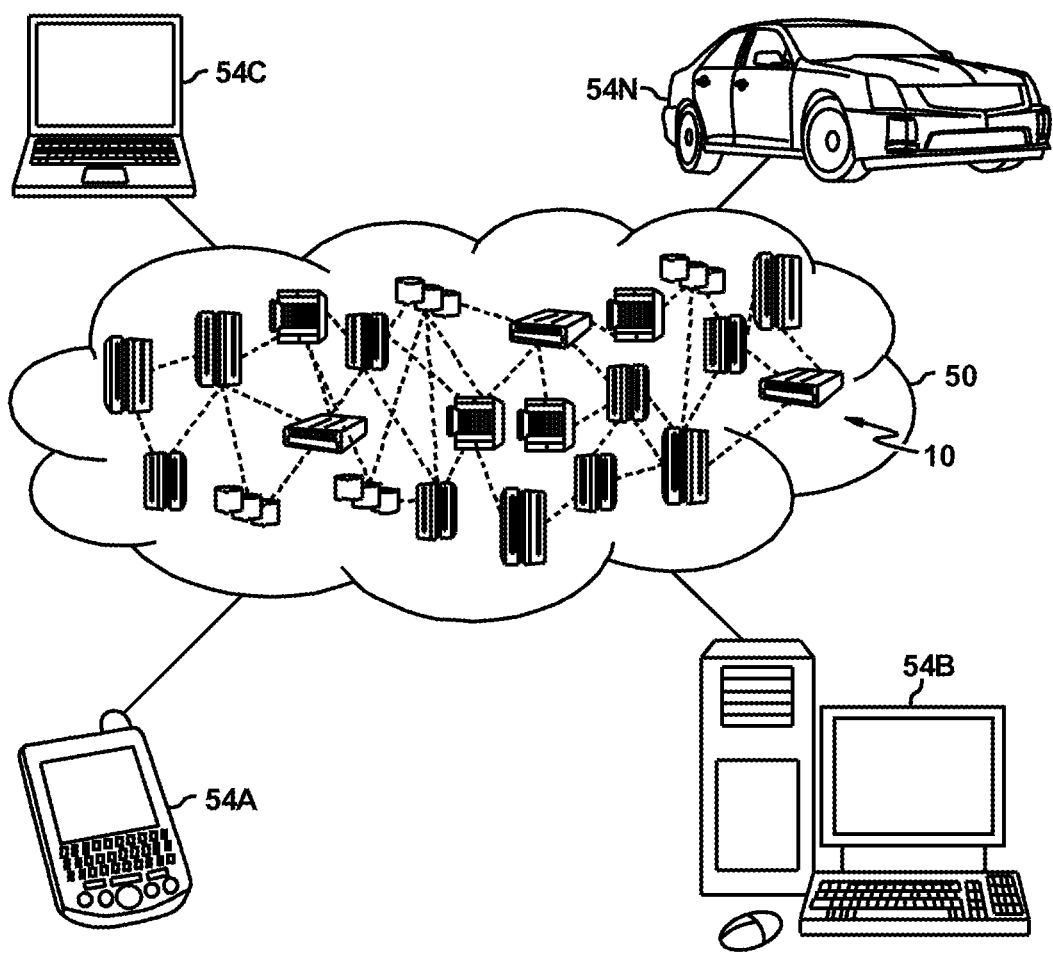
FIG. 5 depicts a cloud computing environment according to an embodiment of the present invention.
Figure 6:
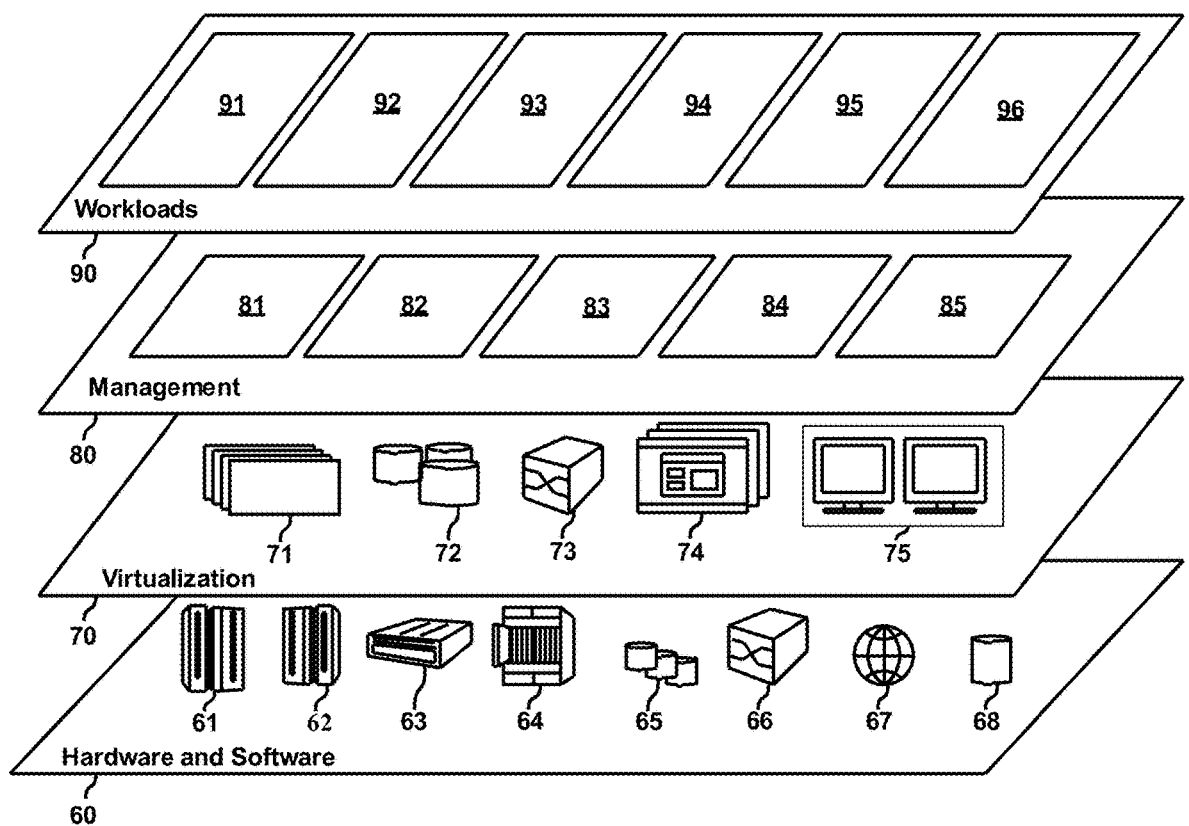
FIG. 6 depicts abstraction model layers according to an embodiment of the present invention.

FIGS. 4, 5, and 6 below describe various enabling technologies related to the physical components and architectures described above.

FIG. 4 is a high-level block diagram of a representative computing device that may be utilized to implement various features and processes described herein, for example, the functionality of stream source 101, injection component 104, addressing database 105, analytics engine 106, message source 107, primary recipient device 103, or secondary recipient devices 110. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor analysis system 96.

The sensor analysis system 96 may accordingly use any of the deployment or service models described to receive sensor data and transmit generated models to computing devices used by first responders or other interested parties, according to the methods previously described.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for message delivery, comprising:
   an addressing database;
   an analytics engine, wherein the analytics engine is configured to select a subset of recipients from a broadcast audience to whom a message should be broadcast, based on one or more rules determined by a user of the analytics engine;
   a computer memory device; and
   a computer processing device that executes instructions stored in the computer memory device to:
      receive, from the addressing database, a set of one or more addresses indicating the subset of recipients;
      inject, into a stream received from a stream origin computing device, a message comprising:
         an end content message; and
         the set of one or more addresses; and
      transmit, to one or more remote display devices used by one or more members of the subset of recipients, and to one or more remote display devices used by one other than a member of the subset of recipients, the stream into which the message has been injected; and
   a receiving application, wherein the receiving application is configured to:
      store one or more addresses representing qualities of a device executing the receiving application or of a user of the device executing the receiving application;
      determine that a stream displayed by one of the remote display devices comprises the message; and
      responsive to determining that one or more of the stored addresses matches one or more of the set of addresses in the message, notify the user of the device executing the receiving application using the end content message.

2. The system of claim 1, wherein the notifying the user of the device that the message is addressed to the user comprises converting at least a part of an inaudible audio message to an audible or visual format.

3. The system of claim 1, wherein the notifying the user of the device that the message is addressed to the user comprises converting at least a part of a visually hidden message to an audible or visual format.

4. The system of claim 1, wherein the injecting the message into the stream comprises selecting a particular moment in the stream to inject the message, based on parameters about the stream or about the message that are received from an analytics engine.

5. The system of claim 1, wherein the receiving application is an application executed by a mobile computing device communicatively coupled to one of the one or more remote displaying devices.

6. The system of claim 5, wherein the mobile computing device is communicatively coupled to the one of the one or more remote displaying devices via a wireless communications protocol.

7. The system of claim 1, wherein the receiving application is executed by one of the one or more remote displaying devices.

8. The system of claim 1, wherein the receiving application is further configured to prompt a user to enter information, and to transmit entered information to the analytics engine.

9. The system of claim 8, wherein a subsequent message is modified based in part on the entered information before injection into the stream.

10. The system of claim 1, wherein the receiving application is further configured to activate a function of a smart appliance in a same residence as a device executing the receiving application.

11. The system of claim 1, wherein the receiving application is further configured to prompt the user to engage a hyperlink to other information or applications accessible by a device executing the receiving application.

12. The system of claim 1, wherein the set of addresses comprises one or more pieces of demographic information about the subset of recipients.

13. The system of claim 1, wherein the set of addresses comprises information regarding past activity of the subset of recipients.

14. A method for isolation of a targeted message from a broadcast, comprising:
   determining, by an application running on a display device comprising a computer processing device and a computer memory device, that a broadcast received by the display device comprises a message in an inaudible and visually imperceptible format and that the message comprises one or more addresses;
   transmitting, to a secondary display device communicatively coupled to the display device, the message or a transformation of the message into an audible or visible form; and
   responsive to determining that one or more addresses of the message match one or more addresses stored in the display device or the secondary display device, displaying a content of the message by an application running on the secondary display device.

15. The method of claim 14, further comprising:
   transmitting, to a server coupled to a source of the broadcast, user information entered by a user of the display device or secondary device in response to the content of the message.

16. A method of generating a targeted message for transmission over a broadcast medium, comprising:
   receiving a stream of audio or video data;

receiving a message for transmission to a subset of an audience of the stream, wherein the subset is selected by an analytics engine applying one or more rules configured by a user of the analytics engine;

adding, to the message, a set of one or more addresses corresponding to the subset of the audience and received from an addressing database;

injecting the message into the stream in a form that does not audibly or visibly convey to a human recipient a content of the message; and broadcasting the stream to the audience of the stream.

17. The method of claim 16, further comprising:

receiving, by the analytics engine and from a member of the subset of the audience, information prompted by the content of the message; and updating a user profile in response to the received information.

18. The method of claim 17, further comprising:

receiving a second message selected for transmission to a second subset of an audience of the stream;

adding, to the second message, a set of one or more addresses corresponding to the second subset of the audience, wherein the set is modified to include or exclude the member based at least in part on the information received from the member; and injecting the second message into the stream.

19. The method of claim 16, wherein the form that does not audibly or visibly convey to a human recipient a content of the message comprises either adding an audio component outside of human hearing range to the stream or bitwise manipulation of color channels in a video component of the stream.

20. The method of claim 16, wherein the subset is selected by the analytics engine based at least in part on information received from an external database storing information regarding one or more members of the audience of the stream.

* * * * *